United States Patent [19]

Ezawa et al.

[11] Patent Number: 5,949,045
[45] Date of Patent: Sep. 7, 1999

[54] MICRO-DYNAMIC SIMULATION OF ELECTRONIC CASH TRANSACTIONS

[75] Inventors: Kazuo J. Ezawa, Clinton; Gregory Napiorkowski, Westfield, both of N.J.

[73] Assignee: AT&T Corp., Middletown, N.J.

[21] Appl. No.: 08/888,024

[22] Filed: Jul. 3, 1997

[51] Int. Cl.⁶ .................................................. G06F 17/60
[52] U.S. Cl. ...................... 235/379; 235/380; 235/492; 705/16; 902/26
[58] Field of Search .................................. 235/375, 379, 235/380, 492; 705/16, 17, 39, 2; 902/22, 26

[56] References Cited

U.S. PATENT DOCUMENTS

| | | | |
|---|---|---|---|
| 4,485,300 | 11/1984 | Peirce | 235/380 |
| 4,700,295 | 10/1987 | Katsof et al. | 364/401 |
| 4,910,660 | 3/1990 | Li | 364/148 |
| 5,345,450 | 9/1994 | Saw et al. | 371/27 |
| 5,386,104 | 1/1995 | Sime | 235/379 |
| 5,389,773 | 2/1995 | Coutts et al. | 235/379 |
| 5,398,300 | 3/1995 | Levey | 395/22 |
| 5,696,907 | 12/1997 | Tom | 395/238 |
| 5,812,668 | 9/1998 | Weber | 380/24 |
| 5,819,226 | 10/1998 | Gopinathan et al. | 705/1 |

FOREIGN PATENT DOCUMENTS

WO 94 06103  3/1994  WIPO .

OTHER PUBLICATIONS

M. Tsvetovatyy et al., "MAGMA: An Agent-Based Virtual Market for Electronic Commerce," First International Conference on Practical Application of Intelligent Agents and Multi-Agent Technology (PAAM), vol. 11, No. 6, 22–24 (Apr. 1996), pp. 501–523.

P.J. Thompson et al., "The Design and Implemantation of the IDIOMS Online Transaction Processing Simulator," Applications of Transputers 3. Proceeding o the Third International Conference on Applications of Transputers (Aug. 1991), pp. 329–334.

M.G. Ketcham, "Simulating Operations in Financial Service Systems," OMEGA, vol. 19, No. 1 (Jun. 1991), pp. 17–30.

A. Classe, "Caught in the Neural Net (Credit Card Fraud Detection)," Accountancy, vol. 115, No. 1218 (Feb. 1995), pp. 58–59.

B. Ruckwood, "The Potential of hte Active Smartcard for Travelers," EPOS/EFTPOS 88 Conference Papers (Sep. 1988), p. 11.

*Primary Examiner*—Thien Minh Le
*Assistant Examiner*—Jared J. Fureman

[57] ABSTRACT

A technique for representing behavioral patterns indicating fraudulent electronic cash transactions through micro-dynamic simulation of an electronic cash transaction system implementable using smart cards with embedded microcomputers. The electronic cash transaction system is stochastically modeled by four categories of agents corresponding to the participants in an electronic cash transaction economy. Some categories of agents are further subdivided into segments that have different characteristics, including the circle of other agents with whom they regularly conduct electronic cash transactions. Agents with counterfeit or fraudulent smart cards may form a segment in the simulation to allow the effects of the counterfeit or fraudulent electronic cash transactions in the complete system to be observed.

20 Claims, 3 Drawing Sheets

MICRO-DYNAMIC SIMULATION OF ELECTRONIC CASH TRANSACTIONS

FIELD OF THE INVENTION

The invention relates generally to computerized simulation of electronic cash transactions. More particularly, the invention relates to representation of fraudulent behavioral patterns by micro-dynamic simulation of electronic cash transactions using smart cards.

BACKGROUND OF THE INVENTION

In contemporary society, the majority of commercial transactions are conducted using currency, credit cards or debit cards (used at automatic teller machines and retail outlets). However, a new medium of exchange is being developed, one that combines the advantages of currency (readily available in easily quantified and verifiable amounts for transactions between individuals without requiring a network intermediary) and credit or debit cards (a compact plastic card that is durable and easily transported). This new medium of exchange is a "smart card."

A smart card is a device, typically the size and shape of a standard plastic credit card, which contains an embedded microcomputer including a microprocessor and associated memory. The smart card also includes an interface between the smart card's embedded microcomputer and the outside world. This interface typically provides for the bidirectional communication of electronic signals to and from the smart card and may consist, for example, of metallic contacts configured to interface with a specially designed connector.

To date, smart cards have been used for a number of different applications. For example, smart cards are used for identification purposes. In this application, the identification number of an individual is recorded in the memory of the smart card. This identification number may be then used to control access to a restricted area or to regulate the distribution of supplies or books. With respect to restricting access, the user would place the smart card in a smart card reader attached to a door. The smart card reader would determine whether the user should be allowed in to the restricted area based on the user's identification number, the time and data and security levels encoded in the smart card. The smart card can be readily modified in accordance with changes in the user's job functions or responsibilities. Moreover, the user can be required to enter a personal identification number which is compared with the personal identification number stored in the smart card to verify that the authorized user has inserted the smart card.

Smart cards are also currently being used as telephone calling cards. In this application, the memory of the smart card records the number of calling units or money associated with the smart card and deducts a portion based on the phone call. For example, a smart card could be initialized with an amount of ten dollars. A user places a telephone call by inserting the smart card into a telephone equipped with a smart card interface. The smart card interface in the telephone would first read the smart card to determine how much money or time is on the card and then deduct money or time from the smart card during the telephone call. British Telecom is presently using a similar smart card system in the United Kingdom.

The portability and convenience of smart cards has generated significant interest in their potential use for financial transactions. A smart card can be programmed to "contain" a specified amount of money and this monetary balance can be readily incremented (reflecting a "deposit" of money into the smart card) or decremented (reflecting a "withdrawal" of money from the smart card) by altering values in the embedded microcomputer memory. For example, the monetary balance recorded in the smart card memory would be decremented when the smart card user paid for a purchase using the smart card. A separate smart card or similar device would have its memory incremented by the same amount, thus reflecting a transfer of money from one smart card to another.

Using smart cards for financial transactions offers numerous benefits to all participants in the economy, including consumers, retailers and banks. However, there are also risks associated with the use of smart cards for financial transactions. In particular, smart cards offer opportunities for fraud. For example, counterfeit cards could be produced or legitimate cards could be altered to fraudulently increase the amount of money associated with the card.

Numerous strategies and techniques are being developed to reduce the possibility of fraud with smart cards. For example, it has been suggested that the information on the smart card should be encrypted to prevent unauthorized access to the data (i.e., monetary balance) stored in the smart card memory. By adequately encrypting the data stored on the smart card, the opportunities for fraudulent "deposits" to the smart card will likely be limited. In theory, a device which is merely capable of accessing the memory of the smart card would be unable to alter the monetary balance stored in the smart card. Rather, only an authorized device capable of performing the necessary decryption and encryption would be able to modify the memory of the smart card without scrambling the data and rendering the card inoperable. Thus, a computer hacker would be deterred from altering the value stored in smart cards by making fraudulent "deposits" that would be analogous to printing counterfeit currency.

Encryption is not the only defense against fraudulent transactions being considered by smart card manufacturers. It is believed that fraudulent use of smart cards, like credit cards and telephone calling cards, will frequently result in consistent and identifiable series of transactions. It has been determined that fraudulent use of credit cards and telephone calling cards may follow a predictable and known pattern. For example, a series of high value purchases on a credit card or several long distance telephone calls to certain nations on a telephone calling card are typically associated with theft of the card and subsequent unauthorized activities. When this type of pattern is detected with respect to credit cards and telephone calling cards, the card issuer frequently verifies the identity of the card user or suspends use of the card pending confirmation of non-fraudulent use.

Credit and telephone calling card issuers have significantly reduced the amount of fraud associated with these cards using software that detects fraudulent behavior patterns and initiates the appropriate response. However, this technique requires interaction with a continuously monitored network for maximum effectiveness. Absent such monitoring and interaction, the fraudulent behavior pattern cannot be readily detected. Moreover, a significant body of historical data had to be generated, collated and analyzed in order to identify the fraudulent behavior patterns.

It is believed that the detection of fraudulent transaction patterns will enable smart card issuers to reduce fraud by monitoring network activity once an adequate body of historical data exists, i.e., once enough fraud has occurred to allow smart card issuers to identify patterns indicating fraudulent transactions. Of course, smart card issuers may extrapolate from existing data relating to credit cards and telephone calling cards, but the significant distinctions between the cards and probable differences in types of fraudulent behavior limit the effectiveness of this technique. Nevertheless, as long as smart card transactions take place over a network, monitoring network transactions to detect fraudulent transactions is a potential technique for reducing fraud.

More importantly, however, there are smart card technologies being developed that do not require a network to conduct financial transactions between smart cards. Once such smart card technology is the Mondex system. It is envisioned that transactions between smart cards will be made directly in these new systems, as if each smart card were a "purse" holding money and the money was transferred directly from one purse to the other, much like dollars are transferred from one person's purse to another person's purse during a private exchange of money as in a personal loan.

One of the more significant differences between these new smart cards and other cards is the ability to directly transfer assets between cards. In typical smart card systems currently in place, a card is read by a card interface connected to a central network through a modem or a similar device, and asset transfers occur via and under the direct supervision of the central network. However, there is no network interaction required for a transaction using the new smart card. For example, a retail store would have its own smart card and a retail terminal with a smart card interface for a customer's smart card or, alternatively, a smart card to smart card interface device known as a "transactor" or "wallet." The transactor has a slot for the store's smart card and a slot for the purchaser's smart card. A sale would be consummated by inserting the customer's smart card into the transactor (retail terminal or wallet) and keying in the transaction price and confirming the transaction. The customer's smart card would be decremented and the store's smart card would be incremented accordingly, thereby immediately transferring funds from the customer to the store without any direct network supervision or interaction.

The smart card can also provide a mechanism for electronic cash transactions over the Internet. A customer's personal computer or terminal equipped with a smart card transactor interface could interact with a similarly equipped system at a web site or at another computer. A transaction could be consummated over the Internet and the appropriate amounts transferred between smart cards.

Furthermore, smart card technologies suitable for multiple currencies are being developed. Each "purse" has multiple "pockets" and each pocket can hold a separate currency. Thus, a single smart card with five pockets could simultaneously represent German Marks, Italian Lire, French Francs, English Pounds and Japanese Yen.

Because every smart card user could have a wallet or transactor of her own, the transfer of funds between smart cards could be readily accomplished when the smart card users inserted their respective cards into the wallet, keyed in the transaction amount and confirmed the transaction. Clearly, there is no opportunity for continuous network supervision of such purse to purse transactions conducted via a wallet. Accordingly, the continuous network interaction which plays an essential role in current fraud protection schemes is unavailable and alternative forms of fraud prevention may be needed.

One alternative form of fraud protection uses on-chip logic (OCL) to control operation of a card and thereby reduce fraud. On-chip logic is intended to detect fraudulent behavior and then turn off the smart card to prevent additional fraudulent transactions with the smart card. If the smart card has been turned off by the OCL in error, (i.e., when it is not being used fraudulently), it can be taken to an authorized bank or issuing authority and turned back on.

Turning off the smart card obviously reduces the number of possible fraudulent transactions. However, there is a significant problem in determining what constitutes a fraudulent behavior pattern. Moreover, it is clearly undesirable to turn off a smart card when there has not been any actual fraudulent behavior. This is particularly problematic with respect to a new technology such as the above described smart card where consumer acceptance is likely to be difficult because of the novelty and lack of experience with this type of transaction. Obviously, consumer acceptance will be adversely affected by a perception that the consumer's card may be switched off without warning during normal operation.

There is thus a need to represent fraudulent behavior patterns in smart card financial transactions that are not necessarily subject to continuous network monitoring. Moreover, it is necessary to accurately identify these fraudulent transaction behavior patterns without erroneously identifying a legitimate transaction behavior pattern as fraudulent. Attaining a satisfactory solution is made more difficult by the need to identify fraudulent behavior patterns before the new type of smart card is widely available. Until electronic cash transactions become a pervasive element of the economy, there will not be a history of transactions available to smart card issuers from which they can identify fraudulent transaction behavior patterns.

It is therefore necessary to dynamically simulate electronic cash transactions in a way that allows modeling of individual transactions and generation of data indicative of behavioral patterns in a statistically relevant population from which trends indicative of fraudulent or counterfeit transactions may be observed.

SUMMARY OF THE INVENTION

In view of the foregoing, there is a need to accurately represent behavioral patterns indicative of fraudulent electronic cash transactions before the electronic cash transaction system is fully operational and/or a substantial history of transaction data has been developed. This invention provides a novel technique for both representing behavioral patterns indicative of fraudulent electronic cash transactions and evaluating the efficacy of various stratagems for preventing or reducing fraudulent electronic cash transactions.

In order to represent behavioral patterns for behavior that has not yet occurred, it is necessary to first adequately model the behavior. Satisfactory behavioral modeling can be attained using stochastic simulation. However, macroscopic simulation techniques cannot provide sufficiently detailed transaction information to allow assessment of the individualized impact of various anti-counterfeiting and anti-fraud stratagems. Instead, what is required is micro-dynamic simulation, wherein the behavior of each participant is individually modeled both individual and corresponding aggregate data, reflecting the simulated behavior of and interaction between numerous individual participants, is readily available for analysis.

Micro-dynamic simulation begins by defining the parameters being modeled. In particular, the "players" or "agents" (i.e., the subjects whose behavior is being modeled) must be defined. Once the identity of the agents has been determined, the characteristics of each agent must then be defined. Agent characteristics include both individual characteristics, such as the maximum amount available for electronic cash transactions in each agent's purse, and interaction characteristics, such as the probability of the agent conducting an electronic cash transaction. Once these elements have been defined, the simulation can be conducted in accordance with provided boundary conditions to generate data for analysis.

Electronic cash transactions using smart cards can be readily modeled using four categories of agents: creators, card issuers, merchants and consumers. Creators are the ultimate source of electronic cash and may be analogous to a central bank such as the Federal Reserve. There is one creator for each currency in an electronic cash transaction system. The remaining three categories of agents, corresponding to banks or other card issuers, merchants of goods and services, and individual smart card users, respectively, are further divided into segments wherein the characteristics of each segment within an agent category may differ. As an example, there could be two segments of card issuers, the first segment corresponding to commercial banks that have no transactions with consumers and the second segment corresponding to full-service banks that have numerous transactions with consumers.

Agents such as card issuers, merchants and consumers may be further defined by their "circle." A circle specifies those agents with whom an agent transacts most often. For a category of agents, a circle can be defined by specifying the minimum and maximum number of agents in a circle and the probability of a transaction occurring with an agent in the circle. Transaction circles reflect the practice of many participants in a market economy to repeatedly conduct most of their transactions with the same people or organizations over time.

Once the agents in the simulation have been satisfactorily defined and the parameters of the simulation have been determined (e.g., number of agents and duration of simulation), then a simulation can be run and data generated. The generated data can be analyzed at both micro (individual) and macro (aggregate) levels.

The micro-dynamic simulator may then be used to represent abnormal (i.e., fraudulent) behavior by introducing behavioral variations and analyzing the effects of these variations. For example, a hypothetical counterfeiting scheme could be defined and a segment of the population implementing the counterfeiting scheme introduced into the model population. Thus, a counterfeiting segment of the consumer agents would be defined. The effects of the counterfeiting scheme in the entire population being modeled (i.e., creator, card issuers, merchants and consumers) could be readily observed and a strategy intended to detect (and possibly defeat) this counterfeiting scheme could be designed. In addition, these observations can also be used as input data sets to train expert systems or other artificial intelligence systems (e.g., neural networks) monitoring transactions to detect fraudulent transactions. Once an anti-counterfeiting strategy was designed, the effectiveness of the strategy could be readily evaluated by incorporating the anti-counterfeiting strategy into the simulation. This would allow for the advantageous detection of unintended side effects of the anti-counterfeiting scheme, such as having an unacceptably large number of non-counterfeit transactions impeded or increasing the impact of another simultaneously modeled counterfeiting scheme. Accordingly, the costs and benefits of the anti-counterfeiting scheme could be readily determined before the anti-counterfeiting scheme was fully implemented.

DETAILED DESCRIPTION

A novel technique of micro-dynamic simulation of electronic cash transactions and representation of fraudulent electronic cash transaction behavior patterns is described herein.

A micro-dynamic simulation is a computer simulation wherein a system is modeled by defining the behavior of each agent or active participant in the system. By defining the behavior in terms of permissible interactions, boundaries, and probabilities, data indicative of real world activities is stochastically generated. Advantageously, the generated data includes both macro or aggregate statistics and micro or individual statistics. Thus, both systemic value fluctuations and individual transactions are readily observable using the same data set.

The first prerequisite for a micro-dynamic simulation is definition of the system being modeled. In an embodiment of the present invention, the system modeled is an electronic cash transaction system. In particular, it is an electronic cash transaction system implemented with embedded microcomputer smart cards capable of direct card to card transactions without direct network supervision. There are four basic categories of agents corresponding to the four types of participants in the electronic cash transaction economy being modeled. Although only four categories of agents are described herein for purposes of clarity, any number of categories of agents could be modeled in accordance with the present invention.

Figure 1:
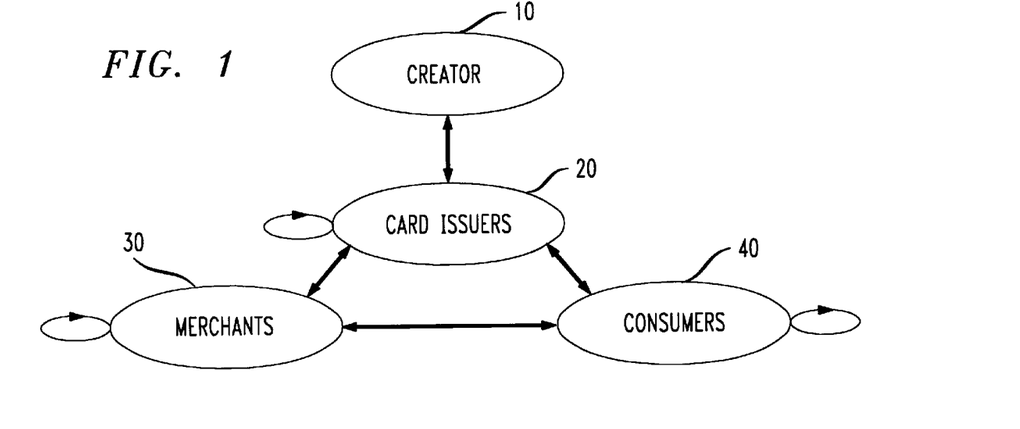
FIG. 1 is a diagrammatic representation of the object structure of a micro dynamic simulation of an electronic cash transaction economy.

Referring to FIG. 1, the four categories of agents modeled in an embodiment of the present invention discussed herein are creators, card issuers, merchants, and consumers. The arrows in FIG. 1 illustrate the categories of agents with whom each category of agents conducts electronic cash transactions. In the embodiment shown, there is only one agent in the creator category, creator 10, and this agent only conducts electronic cash transactions with card issuers 20.

The creator corresponds to an authorized currency issuing authority such as the Bank of England or the Federal Reserve. In general, a creator only has one purse and only conducts direct transactions with card issuers. However, a model may be created wherein multiple creators are defined. In that model, it becomes necessary to define the characteristics of inter-creator transactions such as the relative distribution of transactions amongst the creators. It is not, however, necessary to specify multiple creators if multiple currencies are to be modeled. Multiple foreign currencies may be modeled by defining a foreign currency limit in the creator purse and an exchange rate for each foreign currency.

Accordingly, a purse with several "pockets" that each hold a separate currency may be readily modeled with only one creator.

The second agent category is card issuers. Referring again to FIG. 1, card issuers 20 can generally conduct electronic cash transactions with the creator, merchants, consumers or other card issuers. Card issuers correspond to financial institutions such as banks (e.g., Chase Manhattan Bank) or credit unions (e.g., AT&T Employee Credit Union). Card issuers, unlike creators, may have more than one purse in much the same way as a bank may have a separate safe or main office and branch offices with separately accounted for fund reserves.

Card issuers are further subdivided into types. There are three types of card issuers based on the agents with whom they conduct transactions. The first type of card issuer conducts transactions only with merchants. The second type of card issuer conducts transactions only with consumers and the third type of card issuer conducts transactions with merchants and consumers. All types of card issuers conduct transactions with other card issuers and the creator.

A further subdivision of card issuers is categorization into segments. For example, one segment might be large commercial banks and a second segment might be small savings and loan banks. By dividing a category of agents into segments with different defined behavior parameters it is possible to more accurately model variations in behavior amongst a single agent category. Such variations include, for example, different purse size limits, or average frequency and/or size of transactions.

In an embodiment of the present invention, the properties of each card issuer segment may include a definition of the characteristics of the merchants and consumers associated with the agents in a particular card issuer segment. In an alternative embodiment, the characteristics of the agents associated with each card issuer are defined independently from their association (or lack thereof) with a particular card issuer segment.

The third agent category is merchants. Referring again to FIG. 1, merchants 30 can generally conduct electronic cash transactions with card issuers, consumers or other merchants. Merchants correspond to distributors of goods and services such as wholesalers, retail outlets or garages. Merchants, like card issuers, may have more than one purse in a manner similar to the way a retail outlet may keep separate sales and refund accounts. The merchants category, like the card issuers category, can be further divided into segments.

The fourth agent category is consumers. Referring again to FIG. 1, consumers 40 can generally conduct electronic cash transactions with card issuers, merchants, or other consumers. Consumers correspond to the purchasers of goods and services. Consumers, like card issuers and merchants, may also have more than one purse. The consumers category, like the merchants and card issuers categories, can also be further divided into segments.

Each consumer segment may have a particular on chip logic scheme associated with it. For example, an on chip logic scheme wherein the purse was disabled (i.e., the smart card turned itself off) if the consumer attempted to spend over $1000 in a single day could be defined for a particular segment. The activities of this segment could then be analyzed after the simulation to determine if the on chip logic scheme resulted in an unacceptably large number of wallets being turned off during the simulation.

Moreover, a counterfeit consumer segment could be defined and the efficacy (or lack thereof)of a particular on chip logic in legitimate purses or smart cards with respect to, for example, reduction in the extent of fraudulent transactions could also be evaluated after completing a simulation. The ability to model several different on chip logic schemes simultaneously (by defining different on chip logic schemes for different segments) advantageously permits analysis of interactions between on chip logic schemes.

Furthermore, on chip logic schemes are not restricted to consumer agents. Merchants can also have on chip logic rules incorporated into specified segments, as can card issuers. The effects of counterfeit merchants may also be modeled through the micro-dynamic simulation of the present invention.

The behavior of each merchant or consumer can be further defined in terms of its circle. A circle is comprised of the agents with whom the agent is most likely to conduct electronic cash transactions. A circle reflects a perceived tendency of the real world participants being modeled to conduct the majority of their financial transactions with a relatively limited group of individuals or organizations. For example, a typical person in a market economy such as the United States conducts the majority of her cash transactions with the bank (card issuer) where she has an account and the restaurants(merchants) where she shops or typically dines. It is thus intended to more accurately represent an individual's cash transaction activities through micro-dynamic simulation by modeling this tendency using circles.

For a specific category (or sub-category) of agents, a circle is primarily defined in terms of the minimum and maximum number of agents in the circle and the probability that a transaction will be "in-circle" (i.e., with an agent in the circle). In an embodiment of the present invention, there are four different kinds of circles characterized by the members of the circle. First, there is a circle of merchants with a merchant. Second, there is a circle of consumers with a merchant. Third, there is a circle of merchants with a consumer. Fourth, there is a circle of consumers with a consumer. Each merchant or consumer being modeled will have an established circle. In an embodiment of the present invention, the exact parameters of the circle (i.e., the actual members of the circle) are determined the first time the agent conducts a simulated transaction. The percentage of transactions that occur within the circle and the permissible boundaries as to the number of agents in the circle are predefined, but identification of the precise number of agents in the circle and their identities is deferred. In some computer systems, it is possible to enhance computational efficiency by deferring precise identification of the circle until the agent conducts a simulated transaction. In an alternative embodiment of the present invention, the identities and exact number agents in each agent's circle is determined during initialization.

Figure 2:
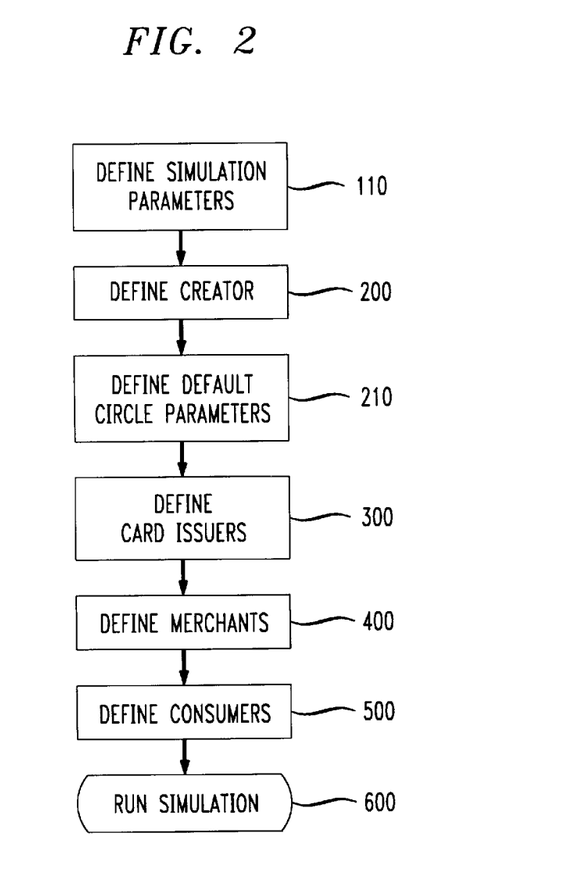
FIG. 2 is a flow chart representation of the procedure for micro-dynamic simulation of an electronic cash transaction system.

Referring to FIG. 2, the basic procedure for a micro-dynamic simulation in accordance with an embodiment of the present invention begins with definition of the simulation parameters 110. The simulation parameters to be defined include the length of the simulation and the size of the starting population. Another possible parameter is the simulation interval (i.e., hourly or daily). Once these parameters have been defined, the characteristics of the agents must be defined.

In an embodiment illustrated by FIG. 2, the characteristics of the creator are defined at step 200. The creator is named and the properties of the creator, including the probability of the creator dying and the foreign currency limits of the creator, if any, are defined. For an embodiment that includes multiple creators, the distribution of transactions between creators (inter-creator transactions) will also be defined.

Referring to FIG. 2, the default parameters of circles can be defined as a creator property in step 210. The parameters defined for default circles become properties of merchants and consumers for whom a circle is not defined when their respective segments are defined. Four circles are defined in terms of the minimum and maximum number of agents in the circle and the probability of any given transaction occurring within the circle.

Referring again to FIG. 2, the properties or characteristics of card issuers are defined in step 300. As shown in greater detail in FIG. 3, card issuers are defined according to several properties. Each segment of card issuers is defined individually as shown by steps 320 through 360. This segment definition process is repeated until all segments have been defined as shown by step 370.

Figure 3:
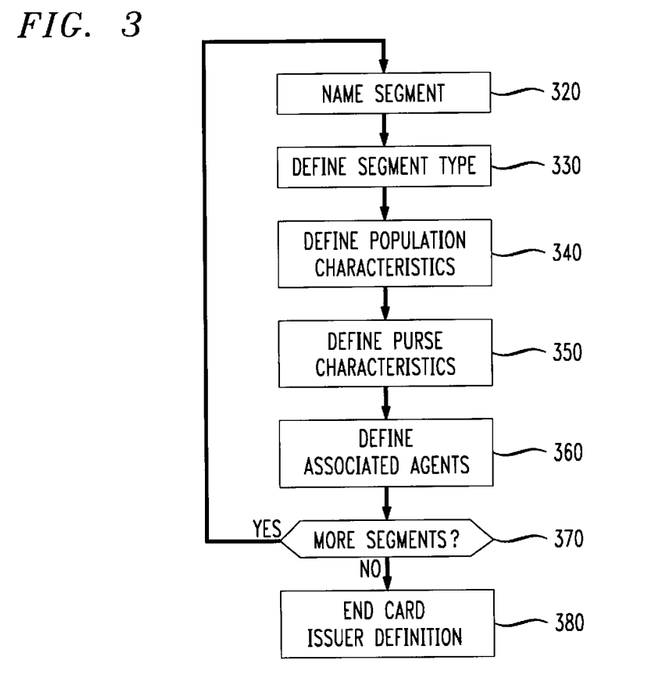
FIG. 3 is a flow chart representation of the definition procedure for a card issuer agent in a micro-dynamic simulation of an electronic cash transaction system.

The first step of the card issuer segment definition process is giving the segment a name as shown by step 320. Once the segment has been named, the card issuer type of the segment is defined as shown by step 330. As noted above, a card issuer can be one of three types, depending on the agents with whom the card issuer conducts transactions: merchant only, consumer only, or merchant and consumer.

Referring to step 340, the population characteristics of the card issuer segment are then defined. Population characteristics include the "birth" rate (the rate at which the number of card issuers increases) and the death rate (the rate at which card issuers drop out of the electronic cash transaction economy being modeled).

Purse characteristics, such as the maximum amount permitted in each card issuers' purse or foreign currency parameters, are defined as shown in step 350. In an embodiment of the present invention, each agent may hold several purses. In such an embodiment, the relative number of purses would be defined in step 350. Additional purse characteristics may also be defined for the card issuers of the segment.

Referring to step 360, characteristics and properties of merchants and consumers associated with a particular card issuer segment may be defined as a function of their relationship with the card issuer segment. Ease of use may be enhanced by defining merchant and consumer characteristics as a function of the card issuer segment definition. In that case, properties of the associated agents are defined as part of the card issuers segment definition process. The defined characteristics include the merchant and consumer population parameters such as the initial merchant population, ratio of consumers to merchants and birth and death rates of the consumer and merchant agents. The defined characteristics may further encompass the on chip logic in the consumer (and/or merchant) purses and the distribution of assets in consumer and merchant purses.

Once a card issuer segment has been completely defined, a determination is made as to whether more card issuer segments need to be defined as shown by step 370. If so, then the card issuer segment definition process is repeated. If not, then card issuer definition is ended as shown by step 380.

Figure 4:
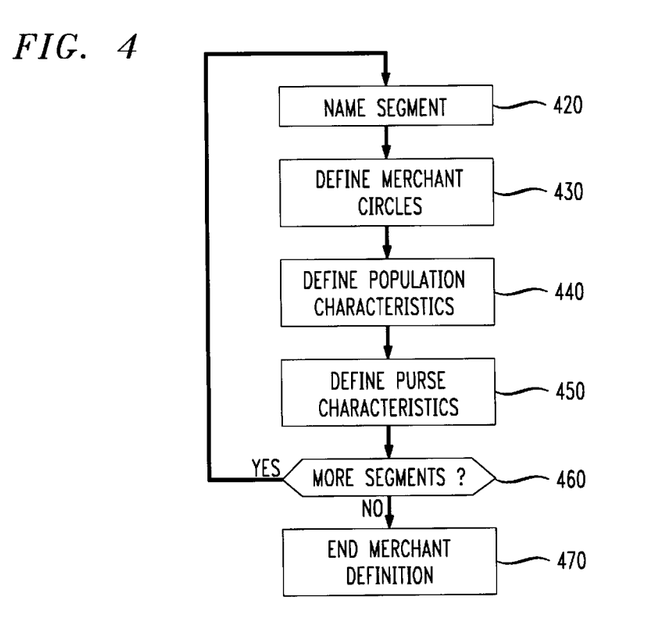
FIG. 4 is a flow chart representation of the definition procedure for a merchant agent in a micro-dynamic simulation of an electronic cash transaction system.

Referring again to FIG. 2, the properties or characteristics of merchants are defined in step 400 which is illustrated in greater detail in FIG. 4. Referring to FIG. 4, the first step of the merchant segment definition process is giving the segment a name as shown by step 420. Once the segment has been named, the circle parameters for each merchant circle are defined as shown by step 430. The merchant's circles includes a circle with other merchants and a circle with consumers. The parameters of these circles are the boundary limits on the number of agents in a circle, the probability of a given transaction taking place within the circle and how many agents from which segments form the circle.

Referring to step 440 of FIG. 4, the population characteristics, such as birth and death rates for the merchant segment, are then defined. Additional characteristics may include stochastic parameters of newly created merchants.

Referring now to step 450 of FIG. 4, the limits and characteristics of the merchant purses, such as the maximum amount permitted in each merchant's purse or foreign currency parameters, are defined. Additional characteristics that may be defined during this step may include, for example, the number and kinds of purses held by an existing merchant and a newly created merchant and how long each purse is considered valid.

Once a merchant segment has been completely defined, a determination is made as to whether more merchant segments need to be defined as shown by step 460. If so, the merchant segment definition process is repeated. If not, then merchant definition is ended as shown by step 470.

Figure 5:
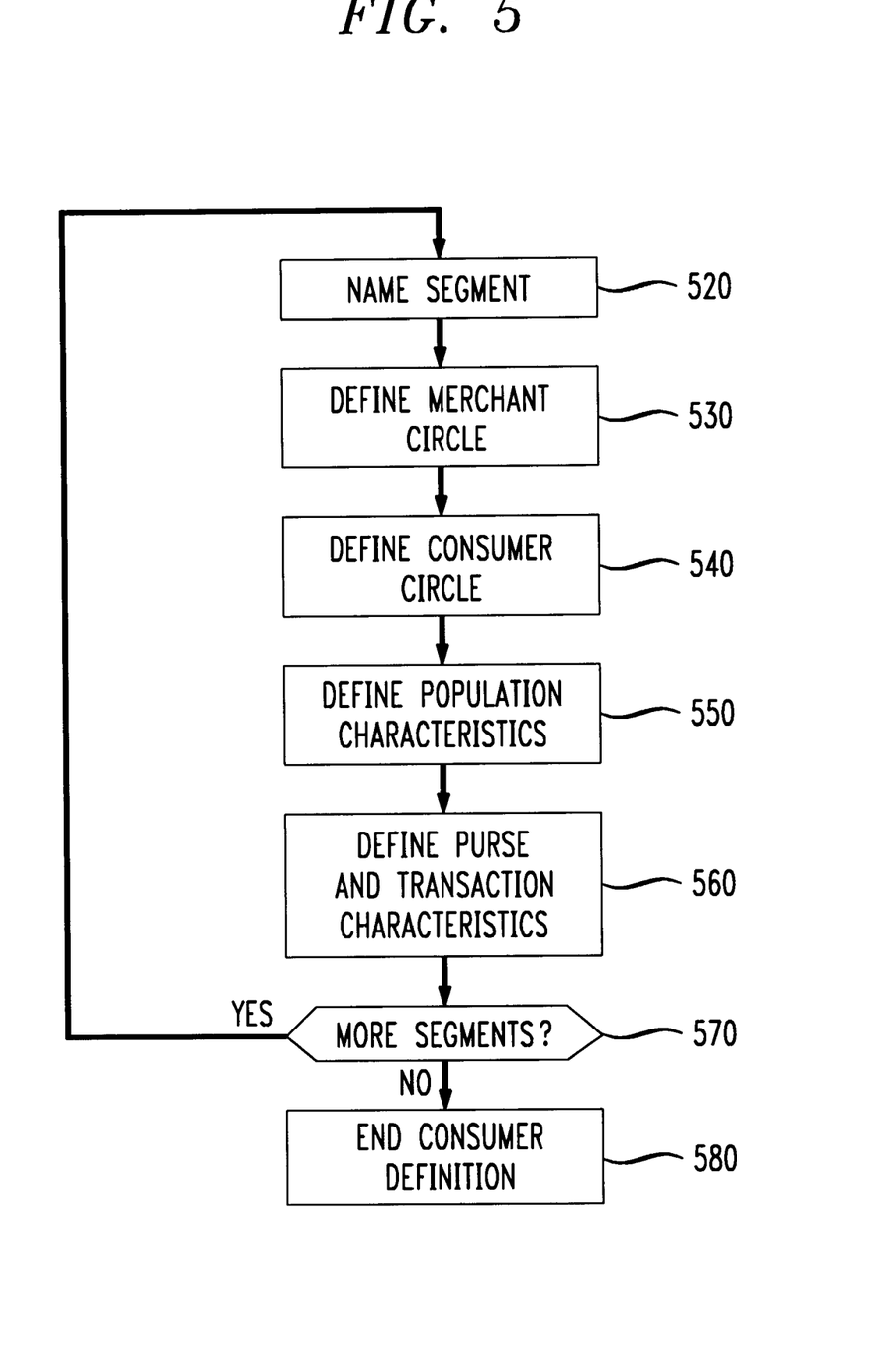
FIG. 5 is a flow chart representation of the definition procedure for a consumer agent in a micro-dynamic simulation of an electronic cash transaction system.

Referring again to FIG. 2, the properties or characteristics of consumers are defined in step 500 which is illustrated in greater detail in FIG. 5. Referring to FIG. 5, the first step of the consumer segment definition process is giving the segment a name as shown in step 520. Once the segment has been named, the merchant circle and the consumer circle parameters are defined. As shown by step 530, the merchant circle parameters, such as the possible size of the circle, the probability of a given transaction taking place within the circle, and the proportion of merchants from each merchant segment are defined. As shown by step 540, the consumer's circle with other consumers is separately defined. The consumer circle parameters are, for example, the possible size of the circle, the probability of a given transaction taking place within the circle, and the proportion of consumers from each consumer segment.

Referring to step 550 of FIG. 5, the population characteristics, such as birth and death rates for the consumer segment, are then defined.

Referring to step 560 of FIG. 5, the limits and characteristics of the consumer purses and the consumer transactions must be defined. The purse characteristics may include, for example, how many and what kinds of purses each consumer has. The transaction characteristics may include the frequency of transactions, the amount of transactions, and the kinds of transactions (e.g., deposits, withdrawals, consumer with consumer, consumer with merchant, etc.). Transaction likelihood may be defined with respect to each hour in a week (i.e., three o'clock on a Sunday morning has different transaction probabilities and characteristics than four o'clock on a Tuesday afternoon) or more coarsely with respect to day of the week.

In addition, the on chip logic, if any, for the consumers' purses may be defined. By defining the on chip logic as a function of the consumer segment, it is possible to simultaneously simulate and observe interaction between several on chip logic schemes. It is also possible to evaluate different on chip logic schemes for different ranges of smart cards, in much the same way as different counterfeit detection schemes may be used for credit cards with varying credit limits.

Once a consumer segment has been completely defined, a determination is made as to whether more consumer segments need to be defined as shown by step 570. If so, then the consumer segment definition process is repeated. If not, then consumer definition is ended as shown by step 580.

Referring again to FIG. 2, the micro-dynamic simulation is run and data made available for analysis in step 600. The exact characteristics of each individual agent being modeled may be determined when the agent is created or the first time the agent conducts a transaction. These characteristics are determined probabilistically from the characteristics for that particular agent as defined with respect to the agent's category and segment.

The generated data may be presented numerically in the form of transaction tables or graphically. Both individual data relating to each agent's transactions and aggregate data relating to, for example, distribution of electronic cash or population growth may be presented. In particular, graphs illustrating the number of purses disabled (counterfeit and non-counterfeit) or the distribution of counterfeit or fraudulent transactions in the entire system being modeled may be generated to allow for quick visual analysis of the observable effects of a counterfeiting scheme or the efficacy of anti-counterfeiting on chip logic.

The generated data may also be formatted as input data for machine learning software. The format of the generated data could be, for example, comma delimited fields. The specific format would be dependent on the requirements of the particular machine learning software to which the generated data would be input.

Although various embodiments are specifically illustrated and described herein, it will be appreciated that modifications and variations of the present invention are covered by the above teachings and within the purview of the appended claims without departing from the spirit and intended scope of the invention. For example, micro-dynamic simulation may be applied to an Internet based electronic cash transaction system in order to represent fraudulent transaction patterns in that environment. Alternatively, any type of transaction may be modeled in accordance with the principles of the present invention.

What is claimed is:

1. A method of modeling an electronic cash transaction system by computerized simulation comprising the steps of:
    defining the simulation parameters;
    defining the characteristics of at least one creator agent of the electronic cash transaction system;
    defining the characteristics of smart card issuer agents of the electronic cash transaction system;
    defining the characteristics of merchant agents of the electronic cash transaction system;
    defining the characteristics of consumer agents of the electronic cash transaction system; and
    running a computer simulation in accordance with said parameters and said characteristics and thereby generating data indicative of electronic cash transactions conducted by said agents.

2. The method of modeling an electronic cash transaction system by computerized simulation of claim 1 further comprising the step of defining circles indicative of the agents with which an agent conducts the majority of said agent's electronic cash transactions.

3. The method of modeling an electronic cash transaction system by computerized simulation of claim 2 wherein said step of defining circles comprises the steps of:
    defining the maximum possible number of agents within said agent's circle;
    defining the minimum possible number of agents within said agent's circle; and
    defining the probability of a transaction by said agent being conducted with an agent in said agent's circle.

4. The method of modeling an electronic cash transaction system by computerized simulation of claim 1 wherein said step of defining the characteristics of card issuer agents of the electronic cash transaction system comprises the steps of:
    defining the purse characteristics of said card issuer agents;
    defining the categories of agents with which said card issuer agents transact; and
    defining the population characteristics of said card issuer agents.

5. The method of modeling an electronic cash transaction system by computerized simulation of claim 1 wherein said step of defining the characteristics of merchant agents of the electronic cash transaction system comprises the steps of:
    defining the purse characteristics of said merchant agents;
    defining the categories of agents with which said merchant agents transact; and defining the population characteristics of said merchant agents.

6. The method of modeling an electronic cash transaction system by computerized simulation of claim 1 wherein said step of defining the characteristics of consumer agents of the electronic cash transaction system comprises the steps of:
    defining the purse characteristics of said consumer agents;
    defining the transaction characteristics of said consumer agents;
    defining the categories of agents with which said consumer agents transact; and
    defining the population characteristics of said consumer agents.

7. The method of modeling a smart card based electronic cash transaction system by computerized simulation of claim 6 wherein said step of defining the characteristics of consumer agents of the electronic cash transaction system further comprises a step of defining conditions under which said consumer agent is prohibited from conducting further transactions.

8. A method of modeling transactions by stochastic simulation comprising the steps of:
    defining a plurality of agents conducting transactions;
    defining the transaction characteristics for each of said plurality of agents using probability functions;
    defining a circle of said agents with which each of said plurality of agents has a probability of conducting a transaction provided a transaction is conducted; and
    simulating transactions conducted by said plurality of agents in accordance with said defined transaction characteristics.

9. The method of modeling transactions by stochastic simulation of claim 8 wherein said step of defining a circle of said agents with which each of said plurality of agents has a probability of conducting a transaction when each of said plurality of agents conducts a transaction comprises:
    defining probabilistically the number of agents inside of the circle;
    defining probabilistically the number of transactions that are conducted with an agent inside of the circle; and
    defining probabilistically the number of transactions that are conducted with an agent outside of the circle.

10. The method of modeling transactions by stochastic simulation of claim 8 wherein said step of defining a circle of said agents with which each of said plurality of agents has a probability of conducting a transaction when each of said plurality of agents conducts a transaction comprises:

defining probabilistically the number of agents inside the circle;

defining probabilistically the proportion of transactions that are conducted with an agent inside the circle; and defining probabilistically the proportion of transactions that are conducted with agents that are outside the circle.

11. The method of-modeling transactions by stochastic simulation of claim 8 wherein said step of defining a circle of said agents with which each of said plurality of agents has a probability of conducting a transaction when each of said plurality of agents conducts a transaction further comprises:

defining the maximum number of said plurality of agents with which each of said plurality of agents has a probability of conducting a transaction when each of said plurality of agents conducts a transaction;

defining the minimum number of said plurality of agents with which each of said plurality of agents has a probability of conducting a transaction when each of said plurality of agents conducts a transaction; and defining the probability of a transaction being conducted with a member of said circle of said agents when a transaction is conducted.

12. The method of modeling transactions by stochastic simulation of claim 8 further comprising the steps of:

associating each of said plurality of agents with a category of agents wherein said associated category determines with which of said plurality of agents each of said plurality of agents may conduct transactions; and segmenting each of said category of agents into at least one segment.

13. The method of modeling transactions by stochastic simulation of claim 12 wherein said step of defining a circle of said agents with which each of said plurality of agents has a probability of conducting a transaction when each of said plurality of agents conducts a transaction further comprises defining the segment with which each of said agents within said circle is associated.

14. A method of providing input data to machine learning software by computerized simulation of an electronic cash transaction system comprising the steps of:

defining the simulation parameters;

defining the characteristics of at least one creator agent of the electronic cash transaction system;

defining the characteristics of smart card issuer agents of the electronic cash transaction system;

defining the characteristics of merchant agents of the electronic cash transaction system;

defining the characteristics of consumer agents of the electronic cash transaction system; and running a computer simulation in accordance with said parameters and said characteristics and thereby generating data indicative of electronic cash transactions conducted by said agents;

providing the results of said computer simulation to machine learning software as input data.

15. The method of providing input data to machine learning software by computerized simulation of an electronic cash transaction system of claim 14 further comprising the step of defining circles indicative of the agents with which an agent conducts the majority of said agent's electronic cash transactions.

16. The method of providing input data to machine learning software by computerized simulation of an electronic cash transaction system of claim 15 wherein said step of defining circles comprises the steps of:

defining the maximum possible number of agents within said agent's circle;

defining the minimum possible number of agents within said agent's circle; and defining the probability of a transaction by said agent being conducted with an agent in said agent's circle.

17. The method of providing input data to machine learning software by computerized simulation of an electronic cash transaction system of claim 16 wherein said step of defining the characteristics of card issuer agents of the electronic cash transaction system comprises the steps of:

defining the purse characteristics of said card issuer agents;

defining the categories of agents with which said card issuer agents transact; and defining the population characteristics of said card issuer agents.

18. The method of providing input data to machine learning software by computerized simulation of an electronic cash transaction system of claim 14 wherein said step of defining the characteristics of merchant agents of the electronic cash transaction system comprises the steps of:

defining the purse characteristics of said merchant agents;

defining the categories of agents with which said merchant agents transact; and defining the population characteristics of said merchant agents.

19. The method of providing input data to machine learning software by computerized simulation of an electronic cash transaction system of claim 14 wherein said step of defining the characteristics of consumer agents of the electronic cash transaction system comprises the steps of:

defining the purse characteristics of said consumer agents;

defining the transaction characteristics of said consumer agents;

defining the categories of agents with which said consumer agents transact; and defining the population characteristics of said consumer agents.

20. The method of providing input data to machine learning software by computerized simulation of an electronic cash transaction system of claim 19 wherein said step of defining the characteristics of consumer agents of the electronic cash transaction system further comprises a step of defining conditions under which said consumer agent is prohibited from conducting further transactions.

* * * * *